3,088,925
PREPARATION OF EXPANDABLE POLYSTYRENE PARTICLES
Wade E. Hall, Millersville, and Algirdas C. Poshkus, Lancaster, Pa., assignors to Armstrong Cork Company, Lancaster, Pa., a corporation of Pennsylvania
No Drawing. Filed Mar. 1, 1960, Ser. No. 11,989
2 Claims. (Cl. 260—2.5)

This invention relates generally to the production of porous shaped masses of thermoplastic synthetic resinous materials. More particularly the invention relates to an improved process for distributing a liquid expanding agent throughout particles of a finely-divided thermoplastic substance in such manner as to prevent agglomeration of the particles.

It is known to utilize discrete particles of a thermoplastic material containing liquid expanding agents in the production of various and useful shaped cellular thermoplastic objects. Such processes are fully described in United States Patent No. 2,442,940, Staudinger et al., issued June 8, 1948, and United States Patent No. 2,744,291, Stastny et al., issued May 8, 1956. This latter patent is incorporated herein by reference.

These two patents describe a process wherein thermoplastic substances, for example polystyrene, in the form of small beads, usually between 10 and 200 mesh per linear inch, are treated to distribute throughout the individual particles or beads a volatile organic liquid having a boiling point lower than the softening point of the thermoplastic substance. These liquids serve as expanding agents once they have been distributed throughout the individual particles of the thermoplastic substance. When the particles are subsequently heated, as with steam or hot water, the thermoplastic substance softens, the volatile organic liquid volatilizes, with the result that the individual particles may be expanded into a cellular particle having 5–30 times the size of the original non-expanded particle. When a suitable amount of the particles containing the liquid expanding agent is placed in a perforated mold and subjected to the requisite heat, the mass of particles will swell, fuse together, and assume finally the shape of the mold. Useful articles in the nature of insulating boards, packing discs, balls, animals, Christmas tree ornaments and the like are thereby formed.

The volatile organic liquid to serve as an expanding agent may be incorporated into the finely-divided particles simply by soaking the particles in the liquid for a suitable length of time. Although the liquids are generally termed "non-solvents or merely swelling agents" for the thermoplastic particles, it has been noted that the soaking process causes a sticking together of the individual particles into a mass which must then be subdivided in order to obtain the expandable particles in particulate form. This sticking of the particles is a nuisance, since it demands an additional operative step to reduce the mass to the form of finely-divided particles, in which form the thermoplastic substance existed in the first place. Sticking of the particles is increased by raising the temperature of the bath in which the particles are soaked; elevated temperatures enhance agglomeration of the particles. The volatile organic liquid is frequently admixed with an inert suspending medium such as the lower glycols, lower alcohols, or water, to cut down sticking, but this has not been very helpful.

It is the primary object of the present invention to supply a process to minimize agglomeration of these thermoplastic particles. It is a further object of the present invention to supply a fast and inexpensive process for incorporating a liquid expanding agent into particles of a thermoplastic substance at elevated temperatures to form expandable particles which are non-sticking to one another throughout a wide range of temperatures.

These objects have been accomplished in a surprisingly effective and straightforward manner. The invention contemplates soaking or wetting the thermoplastic substance in particle form with the volatile organic liquid which is to serve as the expanding agent admixed with the inert liquid suspending medium. To the inert suspending medium is added polyvinyl alcohol; the polyvinyl alcohol serves as the means to prevent sticking and agglomerating of the beads throughout a wide range of temperatures.

The synthetic thermoplastic substance may be polystyrene, a styrene-methyl methacrylate copolymer, or a polymethyl methacrylate.

The volatile organic liquid may be, for example, pentane, hexane, heptane, petroleum ether, spirocyclane, cyclopentane, cyclopentadiene, and certain of the chlorinated hydrocarbons such as dichloroethylene. In normal practice the thermoplastic substance in finely-divided form is simply immersed in the organic liquid. The time required to reach saturation depends to a certain extent on the particle size, and the time may range from 2 or 3 minutes to 12 hours or longer. Elevated temperatures and pressures are used to expedite the absorption process, and it is in the use of these elevated temperatures and pressures that the present invention is particularly valuable. The mass is then removed from the liquid and is allowed to drain.

Commercial polyvinyl alcohols are suitable. The amount of polyvinyl alcohol to be incorporated into the mixture is surprisingly small. Amounts as small as 0.5% by weight polyvinyl alcohol based on the weight of the thermoplastic particles will produce improved results in preventing agglomeration of the beads or particles. It is preferred however to use about 0.75% by weight polyvinyl alcohol based on the weight of the beads. Amounts up to 5% by weight may be used, but these larger amounts include much waste polyvinyl alcohol and are therefore unnecessary.

A convenient manner to add the polyvinyl alcohol is simply to dissolve the polyvinyl alcohol in water or other inert suspending agent and pour the solution into the container wherein the soaking step is to be carried out. Water will be used in an amount by weight of one to 15 times the amount of the expanding agent.

The following examples illustrate specific embodiments of the invention. All parts are by weight unless otherwise stated.

*Example 1*

One part of polyvinyl alcohol (Elvanol 50–42) was dissolved in 1000 parts of water. The polyvinyl alcohol solution and 150 parts of polystyrene beads (40–60 mesh) were placed in a low pressure reactor, and the reactor was assembled. Fifty parts petroleum ether was added through a top opening which was then closed. The reactor was heated to 120° C. over a period of one hour and 22 minutes. The pressure reached 51 pounds per square inch. The reactor was then cooled.

The product was completely non-agglomerated. When the run was repeated under identical conditions save that the polyvinyl alcohol was not added, the polystyrene beads were found to be in a solid mass in the reactor.

Samples of the beads produced in the run using polyvinyl alcohol were formed by heating for one hour at 100° C. and 110° C., respectively. The first product had a density of 1.96 pounds per cubic foot, and the second product had a density of 1.35 pounds per cubic foot.

Example 2

A soaking mixture was prepared as in Example 1 having the following ingredients:

| Ingredients: | Parts |
|---|---|
| Water | 1000 |
| Polyvinyl alcohol (Elvanol 50–42) | 2 |
| Sodium chloride | 80 |
| Polystyrene particles | 150 |
| Petroleum ether | 45 |

The mixture was briefly stirred, heated to 150° C. in 1.5 minutes, held at 150° C. for 4 minutes, and cooled rapidly; cooling took 2 minutes. No agglomeration of the particles occurred.

When these soaked particles were heated for 15 minutes at 100° C., a cellular product was formed having a density of 2.16 pounds per cubic foot.

We claim:

1. The method of forming expandable polystyrene particles having a normally liquid petroleum ether expanding agent in which said polystyrene is insoluble dispersed throughout said polystyrene particles, which method comprises immersing polystyrene particles in a reactor containing an aqueous solution of polyvinyl alcohol containing from 0.5 to 5.0 percent by weight polyvinyl alcohol based upon the weight of said polystyrene, adding about fifty parts by weight of petroleum ether to said aqueous solution, the amount of water in said solution being from 1 to 15 times, by weight, the amount of petroleum ether, sealing said reactor and heating said immersed polystyrene particles at a temperature in the range of 120° C. to 150° C. and a pressure of about fifty-one pounds per square inch, cooling said reactor rapidly, and separating said polystyrene particles in a form free of agglomerates.

2. The method of forming expandable polystyrene beads which comprises forming an aqueous solution by dissolving two parts by weight of polyvinyl alcohol in 1000 parts by weight of water, placing said aqueous solution and one hundred fifty parts by weight of polystyrene beads in a reactor, adding forty-five parts by weight of petroleum ether to said aqueous solution to form a liquid mixture, closing said reactor, heating said polystyrene in said aqueous solution-petroleum ether mixture at a temperature of 150° C. for four minutes, cooling said reactor rapidly, and separating said polystyrene beads free from agglomerates.

References Cited in the file of this patent

UNITED STATES PATENTS

| 2,816,827 | Roth | Dec. 17, 1957 |
| 2,888,410 | Buchholtz | May 26, 1959 |
| 2,893,963 | Cleland et al. | July 7, 1959 |
| 2,911,381 | Roth | Nov. 3, 1959 |
| 2,994,670 | D'Alelio | Aug. 1, 1961 |

FOREIGN PATENTS

| 756,654 | Great Britain | Sept. 5, 1956 |